June 13, 1972   T. O. SNIDER ET AL   3,669,599
HYDROMECHANICAL CLAMP
Filed Dec. 8, 1970
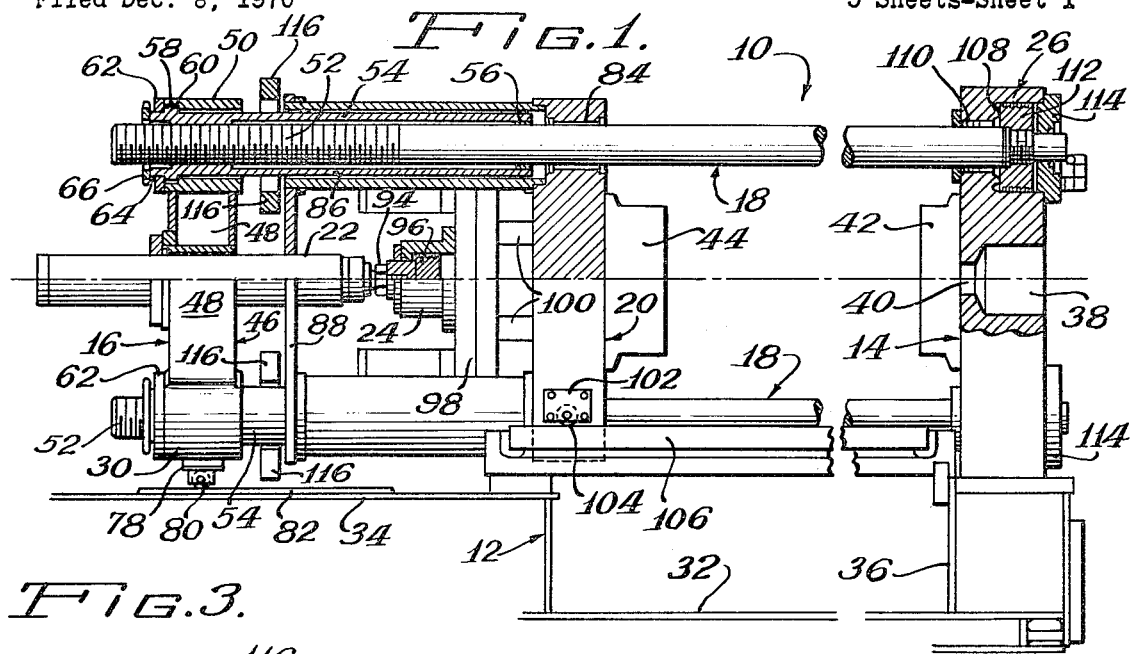
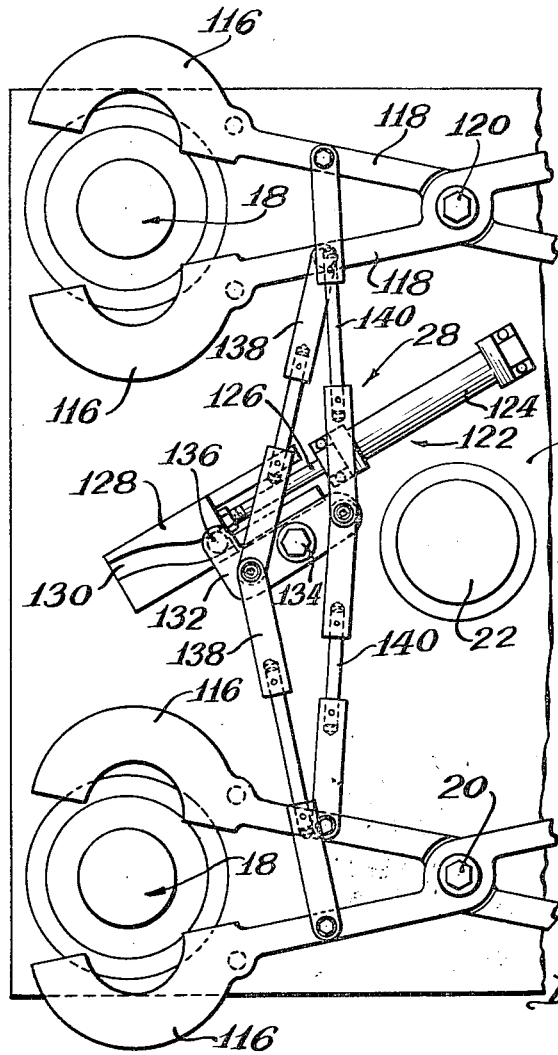
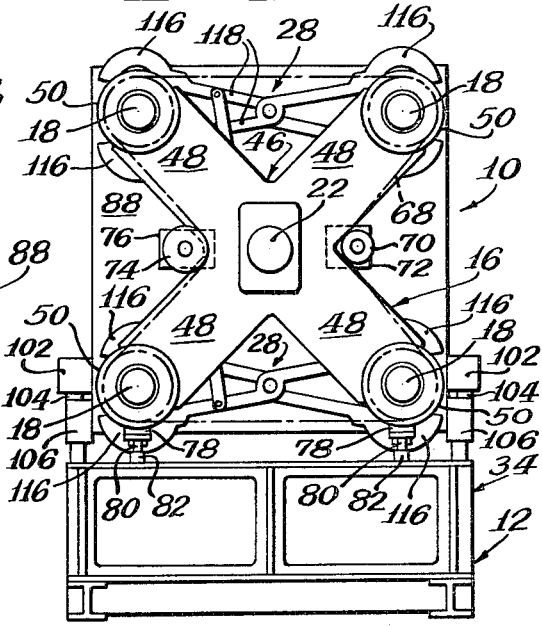
Inventors:
Theodore O. Snider
Michael D. Teeple

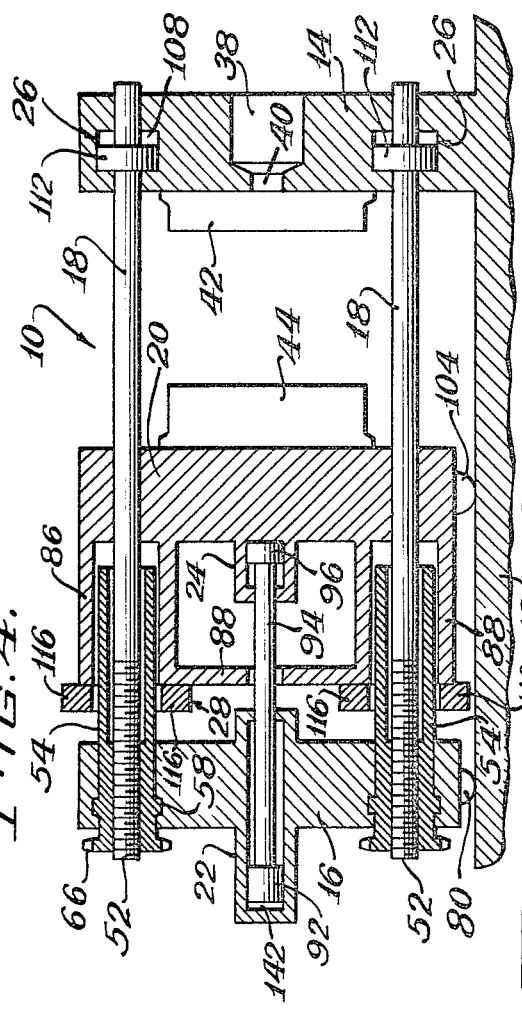

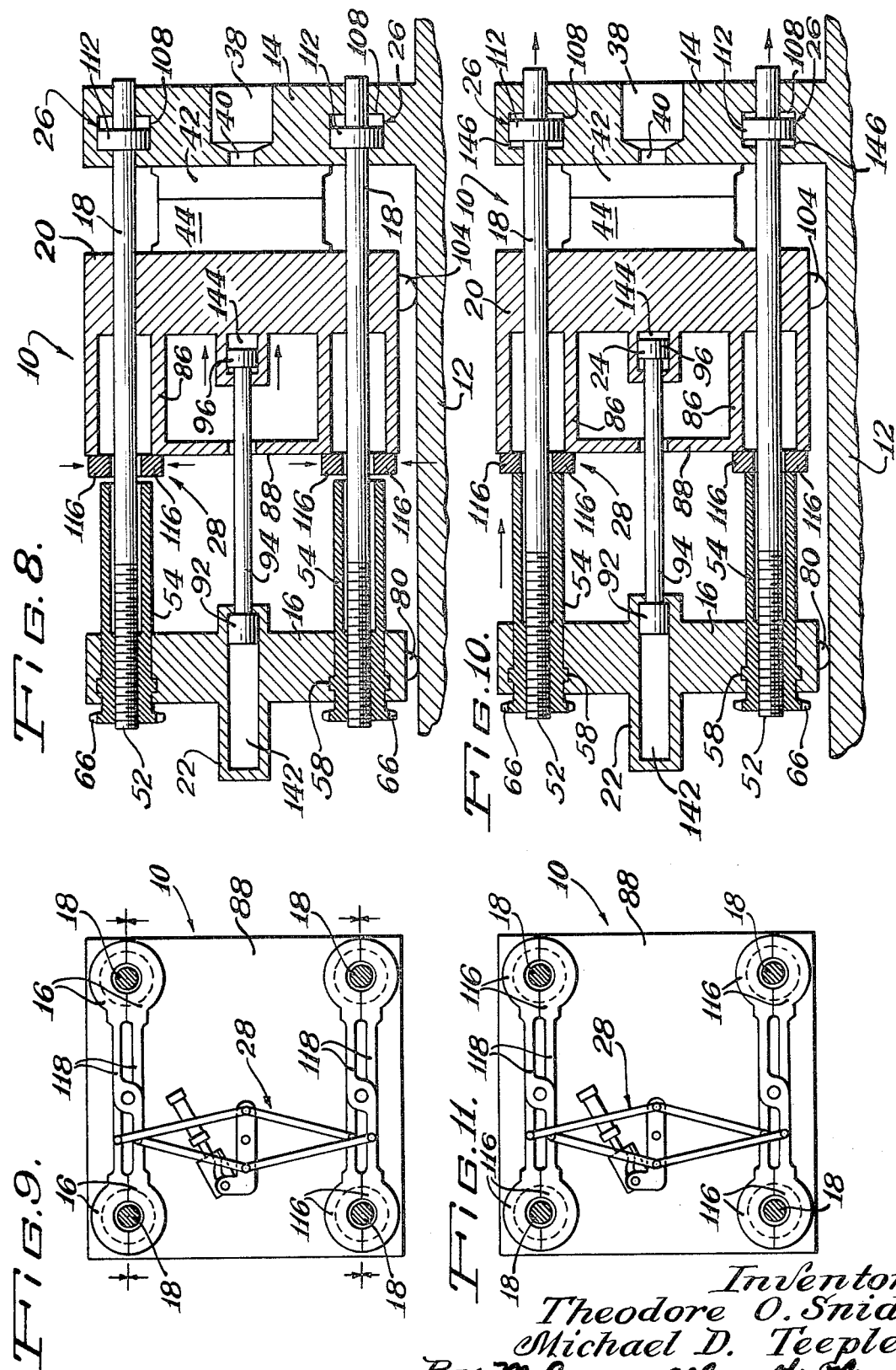

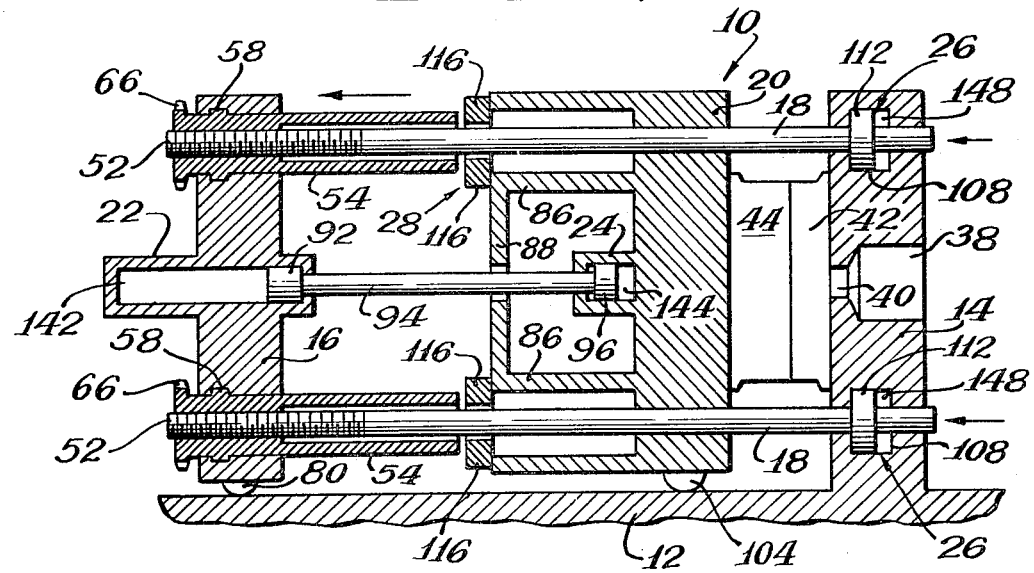
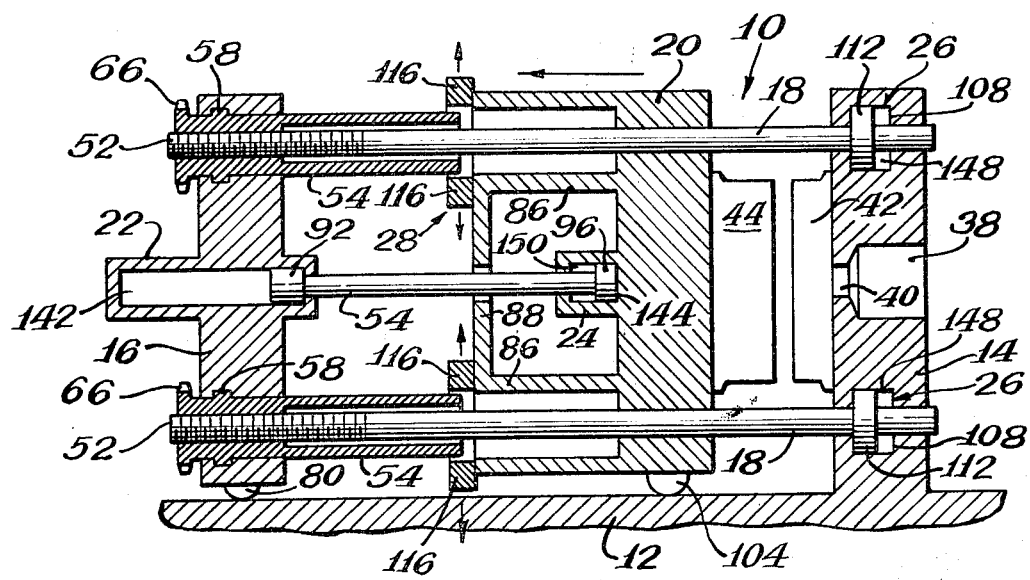

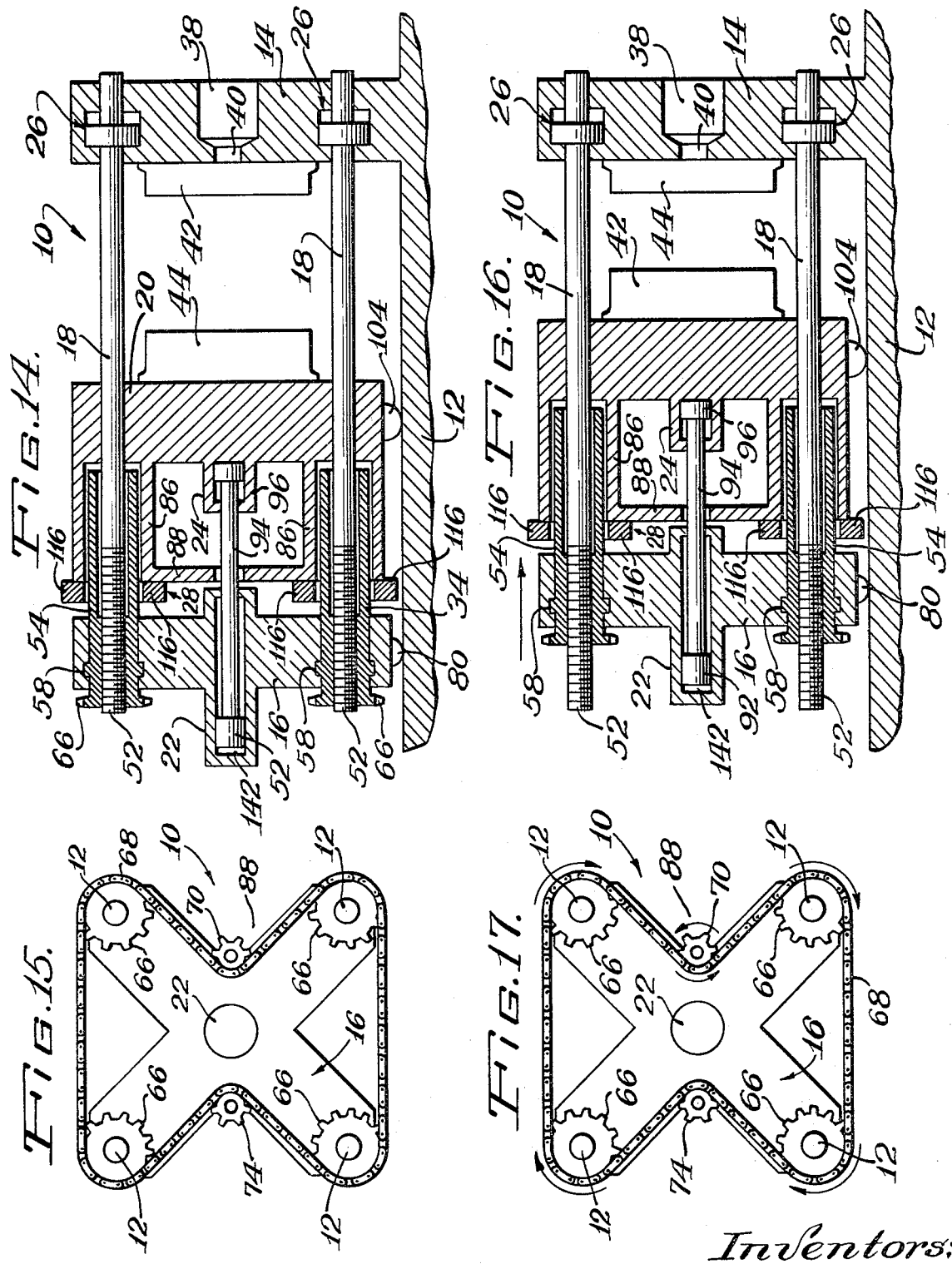

United States Patent Office 3,669,599
Patented June 13, 1972

3,669,599
HYDROMECHANICAL CLAMP
Theodore O. Snider, Dayton, Ohio, and Michael D. Teeple, Fountain City, Ind., assignors to National Automatic Tool Company, Inc.
Filed Dec. 8, 1970, Ser. No. 96,056
Int. Cl. B29f 1/00
U.S. Cl. 425—242
10 Claims

ABSTRACT OF THE DISCLOSURE

An injection molding machine having mold halves which receive pressurized plastic therein. The machine includes a base, a first platen fixed on the base, for holding one of the mold halves, and a back plate mounted on the base and spaced from the said first platen. Tie rods pass between and are mounted to the first platen and the back plate. A second platen is movably carried on the tie rods between the first platen and the back plate and holds the other of the mold halves. Projecting hollow members on the back plate extend toward the moving platen and totally surround the tie rods. Open portions are provided on the second platen for receiving the projecting members when the mold halves are in the open position. Drive means advance the second platen toward the first platen for closing the mold halves. Blocking members are interposed between the projecting members and the moving platen when the mold halves are in the closed position. Load cells are provided on each of the tie rods for clamping the mold halves together during injection of pressurized plastic, the load cells driving the back plate, the projecting members, and the second platen with one mold half thereon into clamping relationship with the first mold half on the fixed platen.

BACKGROUND OF THE INVENTION
FIELD OF THE INVENTION AND DESCRIPTION OF THE PRIOR ART

This invention relates to a clamping mechanism particularly for an injection molding machine and it particularly relates to an injection molding machine having a mechanism for rapidly advancing the moving platen toward the fixed platen and for clamping the mold halves together during injection of the pressurized molten plastic into the mold halves.

In the design of plastic injection molding machines, there are recognized considerations for providing a closing and clamping mechanism which may be readily and rapidly moved to and from the closed or clamping position, while at the same time, the mechanism is to positively clamp the mold halves together during injection of the molten plastic into the mold under extremely high pressure. Because injection pressures are extremely high, the clamping force holding the mold halves together must be high enough to prevent the mold halves from opening or separating when the mold halves are being filled with the pressurized plastic. Mold separation during molding is considered highly undesirable because even with a slight opening, the pressurized plastic material flows into the space between the separated mold halves and a defective product having a parting line or flash results. Such a defect is considered highly undesirable for any plastic molded parts and, in fact, cannot be tolerated in the molding of high quality injection molded products, such as those which must be maintained within critical dimensions.

One of the problems that is encountered in designing cylinders which will not only rapidly advance the moving platen to the clamping position, but which will also provide a high pressure for the clamping force to prevent mold opening, is that a piston of large cross-sectional area is commonly required for accomplishing the necessary clamping pressure while a relatively small cross-sectional area is required to accomplish the rapid advance and retraction. If one large cylinder is used for both the advance and clamping force, a rapid advance at the desired speed is not possible because of the large piston cross-sectional area and cylinder volume required for the rapid advance. On the other hand, a piston of small cross-sectional area or cylinder volume provides a rapid advance at the desired rate, but is inadequate to provide the necessary clamping force. To solve this design dilemma, various mechanisms have been devised to accomplish the rapid advance and clamping of the mold halves together. For example, systems have been devised wherein separate hydraulic cylinder systems have been used in tandem for accomplishing the rapid advance on one hand and the clamping on the other. Although such prior art systems have been operative, they have not always been as mechanically simple and effective as desired. For example, some of the prior art mechanisms require hydraulic cylinders which are still considered to be too large in size.

Furthermore, particularly in the case of large injection molding machines, a large cross-sectional area floor space is required for the machine. Such injection molding machines are particularly long and any reduction in the cross-sectional area and/or length of space required would be highly desirable.

In addition to the desirability of providing an injection molding machine which is relatively small in size, it is desirable to provide a machine which is relatively light weight. Any reduction in the weight of a large size injection molding machine has great advantages, not only in material costs and manufacturing costs, but also in shipping and installation expenses.

SUMMARY OF THE INVENTION

It is therefore an important object of this invention to provide an injection molding machine having a mechanism for rapidly advancing and clamping mold halves together during injection molding, wherein many of the disadvantages of such prior art mechanisms are substantially avoided.

It is also an object of this invention to provide an improved mechanism for rapidly advancing and retracting a moving platen of a clamping apparatus, such as an injection molding machine, and for clamping mold halves together during injection of the molten plastic, wherein a relatively small hydraulic cylinder is provided for the rapid advance and retraction, a relatively short stroke cylinder is provided for the final closing of the mold halves, and a plurality of load cells are provided on each of a plurality of strain rods for clamping the mold halves together during injection molding.

It is yet another object of this invention to provide an improved injection molding machine wherein the overall size and weight of the machine are significantly less than that found in a comparable prior art machine.

It is still a further object of this invention to provide an injection molding machine which utilizes a series of three hydraulic cylinder means for rapidly advancing, closing and clamping mold halves together while reducing the overall size and weight of the machine as compared to a comparable prior art machine.

It is yet a further object of this invention to provide an improved mechanism for an injection molding machine for rapidly advancing a moving platen, closing the same, and for clamping the mold halves together, wherein the mechanism is particularly characterized by simplicity and economy of construction, manufacture and operation.

Further purposes and objects of this invention will appear as the specification proceeds.

The foregoing objects are accomplished by providing an injection molding machine, which includes a base, a first platen mounted on the base for holding one of the mold halves, a back plate mounted on the base and spaced from the first platen, strain rods passing between and joined to the first platen and to the back plate, a second platen carried on the strain rods for movement between the first platen and the back plate, and holding the other of the mold halves, members mounted on the back plate projecting toward the second platen and surrounding the strain rods, means on the second platen for telescopically receiving the projecing members when the mold halves are in the open position, drive means for advancing a second platen towards the first platen for closing the mold halves, blocking members being interposed between the projecting members and the receiving means when the mold halves are in the closed position, and load cells on each of the tie rods for clamping the mold halves together during injection of pressurized plastic, the load cells driving and clamping the back plate, the projecting members, and the second platen and thereby the moving mold half into clamping relationship with the first mold half.

BRIEF DESCRIPTION OF THE DRAWINGS

One particular embodiment of the present invention is illustrated in the accompanying drawings wherein:

FIG. 1 is a side elevational view of the preferred embodiment of the present invention;

FIG. 2 is an end view of the embodiment of FIG. 1, as viewed from the back plate end of the machine;

FIG. 3 is an enlarged, end detail view of the blocking members used for interposition between the back plate and the second platen, so that the second platen may be clamped in the closed position relative to the first platen;

FIG. 4 is a side elevational, schematic view of a preferred form of our invention which shows the injection molding machine in the open position;

FGI. 5 is an end view of the embodiment of FIG. 4, showing the position of the blocking members;

FIG. 6 is a view like that of FIG. 5, but showing the moving platen as it is moved toward the fixed platen;

FIG. 7 is an end view of the embodiment of FIG. 6, showing the corresponding position of the blocking members;

FGI. 8 is a view like that of FIGS. 4 and 6, showing the blocking members interposed between the moving platen and the back plate;

FIG. 9 is an end view of the embodiment of FIG. 8, showing the corresponding position of the blocking members;

FIG. 10 is a view like that of FIGS. 4, 6 and 8 showing the clamping of the mold halves together during the injection of plastic into the mold halves;

FIG. 11 is an end elevational view of the embodiment of FIG. 10, showing the corresponding position of the blocking members;

FIG. 12 is a view like that of FIGS. 4, 6, 8 and 10, showing the apparatus as the clamping pressure is relieved;

FIG. 13 is a view like that of FIGS. 4, 6, 8, 10 and 12, showing the clamping members as they are removed from interposition between the back plate and the moving platen and as the mold halves are moved to the open position;

FIG. 14 is a side elevational, schematic view of our invention illustrating the spacing of mold halves prior to movement to a more proximate position relative to each other;

FIG. 15 is an end view of the embodiment of FIG. 14, showing the mechanism for adjusting the starting position of the moving platen;

FIG. 16 is a view like that of FIG. 14, showing the moving platen being moved to a more proximate position to the fixed platen; and FIG. 17 is an end view of the embodiment of FIG. 16, showing positive adjusting mechanism moving the moving platen from the position of FIG. 14 to that of FIG. 16.

DETAILED DESCRIPTION OF THE PREFERRED EMBODIMENT

Referring particularly to FIGS. 1–3, our injection molding machine 10 is shown in detail. Generally, the machine 10 includes a base 12 having a stationary or fixed die head or platen 14 and is movably mounted on and projects upwardly from the base 12. Four strain rods 18 pass between the four corners of the back support 16 and those of the stationary platen 14 and are interconnected to each. A moving platen or die head 20 is movably carried on the strain rods 18 in the space between the stationary platen 14 and the back support 16. A traversing cylinder 22 is rigidly mounted to the back support 16 and provides for rapid advance and retraction of the moving platen 20. A closing and opening cylinder 24 is also mounted on the moving platen 20 and is operatively connected to the cylinder 22. Load cells 26 are defined in the stationary platen 14 and are operatively connected to the strain rods 18 to hold the moving platen 20 in a fixed position relative to the stationary platen 14 during injection molding, the clamping mechanism, generally 28, is operative so that the force imparted by the load cells 26 is transmitted to the rear face of the moving platen 20 to hold it in the desired fixed position during injection molding.

The base 12 includes a lower section 32 and an adjacent upper section 34. The lower section 32 is located below the space between the stationary platen 14 and the moving platen 20 for receiving parts. The stationary platen 14 is rigidly mounted upon the raised base section 36 which extends upwardly from the lower base portion 32.

The stationary die head, made of steel, is substantially square in cross-sectional shape. The exterior face of the stationary platen 14 has a cavity 28 at its central portion for receiving the injection head (not shown) of the injection molding machine 10. The injection head injects the pressurized molten plastic through the opening or gate 40 into the mating die halves 42 and 44, mounted on the stationary platen 14 and the moving platen 20, respectively.

The back support 16 comprises a generally upright cross frame 46. The cross frame 46 includes four arms 48 angularly spaced from each other at approximately 90° angles in a vertical plane. The back support cross-frame 46, as best shown in FIG. 1, is preferably of hollow construction and is relatively light in weight, an important consideration in the construction of an injection molding machine. The outer ends of each of the arms 48 support cylindrical bearing members 50. The strain rods 18 pass between and are interconnected to the back support 16 and the stationary platen 14. More specifically, one end of each of the strain rods 18 passes through the bearing members 50. A substantial portion of each of the strain rods 18 is threaded, as at 52, in the end portions located in the vicinity of the back support 16. An elongated rotatable nut member 54 is rotatably carried by each of the bearing members 50 and each is threadably interconnected to a threaded end 52 of each strain rod 18.

As will be described hereinafter in greater detail, in order to adjust the starting or initial spacing between the stationary platen 14 and the moving platen 20, the back support 16 is adjustable to a desired spacing from the stationary platen 14. Each nut member 54 is internally threaded for threaded interengagement with the threaded ends 52 of the strain rods 18. The remaining elongated portion of each nut member 54 telescopes around a substantial portion of the outer surface of each strain rod 18. The inner end of each nut member 54 has a bearing 56 mounted thereon for providing sliding relationship with each of the surrounded strain rods 18. Each nut member 54 has an annularly enlarged portion 58 received in an internal annular recess in each bearing 56. An external collar 62 is mounted on the exterior annular end of each of the bearings 56 for preventing relative axial movement between the back support and the nut members 54 which provides rotational movement between the bearing members 50 and the nut members 54 so the back plate is adjustably movable on the strain rods.

The outer end 64 of each nut member 54 projects slightly beyond the outer end of the retaining collar 62. A sprocket 66 is rigidly mounted to the projecting outer end 64 of each of the nut members 54 and a link chain 68 operatively engages each of the sprockets 66. Referring to FIG. 2, an idler sprocket 70 is mounted on a bracket 72 mounted on the back support 46, at the juncture between a pair of arms 48 of the cross frame 46 and between one upper and lower set of sprockets 66. The idler sprocket 70 engages the link chain 68 and guides it in a path of travel substantially coinciding with the upper and lower arms 48 of the cross frame 46. A drive sprocket 74 is operatively connected to a drive motor 76 which is rigidly mounted to the juncture between two arms 48 of the cross frame 46 opposite the mounting of the idler sprocket 70. Rotation of the drive sprocket 74, in one direction or the other, thereby rotates all of the sprockets 66 and all of the nut members 54 for adjustment of the spacing between the back support assembly 16 and the stationary platen 14.

The lower pair of the bearing members 50 have bearing mountings 78 mounted in their underside and bearings 80 are mounted therein. Bearings 80 ride on a bearing plate 82 mounted on the upper surface of the raised base section 34 of the machine base 12. These bearings 80 enable the relative motion between the back support 16 and the base 12 when the back support 16 is being traversed to a selected position relative to the back plate 16.

The moving platen 20 is slidably mounted on the strain rods 18 and may be traversed between the back support 16 and the stationary platen 14. The moving platen 20 has substantially the same cross sectional shape as the stationary platen 14 and is also made of a solid block of steel. Journal bearings 84 are mounted within apertures provided in the four corners of the moving platen 20 to provide for the slidable movement of the moving platen 20 on the strain rods 18. Four hollow cylindrical members 86 project rearwardly from the rear face of the moving platen 20. The hollow members 86 are rigidly secured to the moving platen 20 and telescopically surround both the strain rods 18 and the nut members 54, the hollow members 86 thereby being movable in and out of telescoping relationship with the nut members 54. A support plate 88 is rigidly mounted on the outer end portions of each of the hollow members 86 so as to provide a suitable mounting for the clamping mechanism 28.

The traversing cylinder 22 is rigidly secured to the central portion of the cross support 46 of the back support 16. A piston 92 is slidably carried within the cylinder 22 and has a piston rod 94 projecting from the cylinder 22 toward the moving platen 18. The cylinder-piston arrangement 22–92 is a double-acting cylinder and suitable hydraulic connections (not shown) are made to the cylinder 22 so that the piston rod 94 may be traversed in a direction both to and from the stationary platen 14. The cylinder 22 passes through a suitable aperture in the central portion of the clamping mechanism support plate 88. The traversing cylinder 22 is of relatively small cross sectional area and accomplishes the rapid advance and retraction of the moving platen 20, as will be described hereinafter in greater detail.

The outer end of the piston rod 94 has a piston 96 rigidly mounted thereon. The piston 96, larger in diameter than the piston in the cylinder 22 (although in schematic views FIGS. 4–16, the pistons 92 and 96 appear to be the same diameter) is located within the closing and opening cylinder 24, which is rigidly interconnected to the moving platen 20 through a support assembly 98. The support assembly is rigidly interconnected as by connecting plates 100 to the exterior surface of the moving platen 18, which is the surface opposite that upon which the die half 44 is mounted.

The closing and opening cylinder 24 is generally mounted on the outer base of the support assembly 98 at its central portion. Suitable hydraulic connections (not shown) are provided for operating the double acting cylinder 24. The cylinder 24 is operative for the final closing and initial opening of the die halves 42 and 44, prior to and after injection of the molten plastic into the mold halves.

In addition to the internal bearings 84 which provide for the slidable mounting of the moving platen 20 on the strain rods 18, bearing mountings 102 having bearings 104 therein are mounted along the lower surface of the moving platen 20. Bearing plates 106 are mounted on the base 12 and extend between and are mounted on the upper base section 34 and the raised portion 36 of the lower base section 32. The bearings 104 ride on the bearing plates 106 to assist in the movement of the heavy moving platen 20 toward and away from the stationary platen 14.

The load cells 26 are double-acting, high-pressure cylinders for providing the final clamping pressure for holding the die halves together during the injection molding of pressurized molten plastic into the mold halves. The stationary platen 14, in each corner, has a cylinder defining cavity 108 formed therein. One end of the strain rod 18 passes into the cylinder cavity 108 and a suitable seal 110 of high-pressure capacity is interposed between the strain rod 18 and the aperture through which the strain rod must pass to extend into the cylinder cavity 108. A piston 112 is rigidly mounted as by threaded engagement with the end portion of each of the strain rods 18. The outer end of the cylinder cavity 108 is enclosed by a cap member 114 which pressure seals the hydraulic cylinder cavity 108. The outer end of the strain rod 18 passes through an aperture in the cap 114 and is in sliding sealed relationship therewith. Again the load cells 26 are interconnected to a suitable hydraulic pressure source (not shown).

After the traversing cylinder 22 and the closing cylinder 24 have moved the die halves into abutting closed relationship, the clamping mechanism 28 is closed for enabling the transmission of the clamping pressure from the load cells 26 ultimately to the moving platen 20, which operation will be described hereinafter in greater detail.

Referring particularly to FIG. 3, the clamping mechanism 28 includes four blacking portions 116 which are movable in and out of blocking position between the outer ends of the nut members 54 and the hollow members 86 respectively. The blocking portions 116 are shaped so that in the closed position, they span the strain rods 18. The blocking portions 116 are interposed between each hollow member 86 and each nut member 54, in pairs, as shown. Desirably, the blocking portions 116 are each mounted on the opposite ends of an elongated arm 118. Each arm 118 is pivoted by a pin 120 to the support plate 88. As shown, one blocking member 116, passes around one strain rod 18 from the upper side of the strain rod, while the opposite blocking portion 116 passes around the adjacent, horizontally spaced strain rod 18 from the lower side of the strain rod 18. With the described structure, four pairs of blocking portions 116 are mounted on four arms, each pair of blocikng portions defining one blocking arrangement on each strain rod.

Each pair of arms, one being for the upper pair of strain rods and one being for the lower pair of strain rods, is operated generally by a scissors type of action through the drive mechanism, 122. The drive mechanism 122 includes a cylinder 124, preferably hydraulic, which is rigidly mounted to the support plate 88. A piston rod 126 extends outwardly from the piston (not shown) within the cylinder 124 and has a cam plate 128 with a camming track 130 therein. A crank arm 132 is pivotally mounted on a pivot pin 134 which is rigidly mounted on the support plate 88. The crank arm 132 has a cam follower 136 mounted thereon, which rides in the cam track 130. A first set of oppositely projecting links 138 are pivotally interconnected at a common pivot point to the crank arm 132 at one side of the pivot pin 134 and the projecting ends of these links are interconnected to the parallel upper and lower blocking arms 118. A second set of oppositely projecting links 140 are pivotally interconnected to the crank arm 132 on the opposite side of the pivot pin 134 and the projecting ends of these lines are interconnected to the other parallel pair of upper and lower blocking arms 118. Thus, as the cylinder 124 moves the cam plate 128 relative to the cam follower 136, the crank arm 132 is pivoted about the pin 134 and the blocking members, through the arms 118, are moved in and out of blocking position around the strain rods 18.

With reference particularly to FIGS. 4–13, the sequence of operation of our clamping mechanism cycle will be shown and described in detail. FIGS. 4–13 are generally schematic, although the essential details are shown in all these schematic drawings.

Referring to FIG. 4, the injection molding machine 10 is shown in the starting position when the mold die halves 42 and 44 are spaced apart. By suitable controls, when it is desired to close the mold halves 42 and 44, hydraulic pressure is applied to the advancing side of the piston in the traversing cylinder 22 for advancing the moving platen 20, with the die half 44 thereon, toward the fixed die half 42, mounted on the stationary platen 14. The extent of advancement by the traversing cylinder 22 is shown in FIG. 6 in its fully extended position. The hollow members 86 and the clamping mechanism 28, being interconnected to the moving platen 20, are advanced therewith. The closing and opening cylinder 24 is also advanced with the moving platen 20. Referring to the schematic end views, FIGS. 5 and 7, it is seen that the clamping or blocking mechanism 28 remains inoperative during the rapid advance of the moving platen 20 from the position of FIG. 4 to the position of FIG. 6.

After the traversing cylinder has advanced the moving platen 20, to the position shown in FIG. 6, the advance of the piston rod 94 and piston 92 is stopped and pressure is applied to the closing side of the piston 96 in the closing and opening cylinder 24. Pressure on the closing side of the cylinder 144 advances the die half 44 from the slightly spaced position as shown in FIG. 6, to the fully closed position, as shown in FIG. 8, when the die halves 42 and 44 are in abutting relationship.

Simultaneous with operation of the closing and opening cylinder 24 to move the die halves 42 and 44 into the closed and abutting position, the hydraulic cylinder 124 of the clamping mechanism 28 operates to rotate the cam plate 128 from the position shown in FIG. 7 to the position shown in FIG. 9. This movement of the cam plate 128 causes the crank arm 132 to pivot in a counter-clockwise direction about the pivot pin 134. Through the connection of the links 138 and 140, the blocking portions 118 are pivoted above the pivot pins 120 to the closed position, straddling the strain rods 18. In the closed position, the blocking members 116 are interposed in pairs between the annular ends of the hollow members 86 and the annular ends of the nut members 54.

With the blocking members 116 in place, and with the die halves in the fully closed position, the die halves 42 and 44 are ready to be filled with pressurized plastic and the load cells 26 must then be operated to forcibly clamp the mold halves in the closed position.

Referring to FIGS. 10 and 11, high hydraulic pressure is applied to the clamping side 146 of each piston 112 in the cylinder cavities 108 so as to pull the strain rods 18 in the direction shown by the arrows in FIG. 10. This pulling of the strain rods 18 drives the back support 16 in the same direction because the strain rods 18 are interconnected to the back support 16 by means of the nut members 54. The nut members 54, in turn, are pulled and bear against the blocking members 116. The blocking members bear against the hollow members 86 to hold the moving platen 20 and moving die halves 44 in clamping engagement with the first die half 42 during the pressurized injection molding operation. The four load cells combined to provide sufficient clamping pressure to maintain the die halves 42 and 44 in clamping engagement during the injection molding operation so as to prevent mold separation.

Following the completion of the injection operation, pressure is released from the clamping side 146 of the piston 112 in each load cell 26 and pressure is applied to the relief sides 148 of each of the pistons 112 thereby slightly moving the back support 16 away from the blocking members 116. As shown in FIG. 13, pressure is applied to the opening side 150 of the closing and opening cylinder 24, so as to separate the die halves 42 and 44. Simultaneously, pressure is applied to the pneumatic cylinder 124 to reverse the movement of the cam plate 128 so that the cam follower 136 pivots the crank arm 132 to the open position and the blocking arms 118 move the blocking members 116 out of interposition between the hollow members 88 and the nut members 54. Pressure is thereafter applied to the advancing side of the piston in the traversing cylinder 22 so as to open the moving platen 20 relative to the fixed platen so that the molded part may be removed from the die halves.

Referring to FIGS. 14–17, the mechanism for adjusting the initial or starting spacing between the moving platen and the stationary platen 14 is shown. If, for example, it is desired that the half 42 is to be moved to a relatively closer position to the die half 44 than shown in FIG. 14, the drive motor 76 rotates the sprocket 74 which drives the chain 68. The driven chain 68 rotates all four of the sprockets 66 rigidly mounted on the nuts 54 at the threaded ends of the strain rods 18. This causes the entire back support 16 and moving platen 20 to be moved on the base 12 to a position closer to the stationary platen 14. If it is thereafter desired to open the spacing between the platens, the drive motor merely operates in a reverse direction to reverse the movement of the nut members 54.

With the foregoing construction, we have accomplished all the objects previously set forth. By providing the telescoping relationship between the nut members on the back support and to the hollow members on the moving platen, the required overall length of the injection molding machine is reduced. The telescoping relationship between the hollow members mounted on the moving platen and the nut members mounted on the back support combine with the mechanism which interposes the blocking members between these two members for accomplishing the reduction in the overall length and floor space requirement of the machine. Also, by providing four load cells, individually small in diameter and also integral parts of the stationary platen, we are able to greatly reduce the overall weight of the injection molding machine because no large clamping cylinder is required. The advancing cylinder is elongated but small in cross section and overall is relatively small in size. Also, the closing and opening cylinder is small in size. Thus, we have provided an injection molding machine which is relatively short in length and light in weight and yet is highly efficient and effective in operation.

While in the foregoing there has been provided a detailed description of a particular embodiment of the present invention, it is to be understood that all equivalents obvious to those having skill in the art are to be included within the scope of the invention as claimed.

What we claim and desire to secure by Letters Patent is:

1. An injection molding machine having mold halves for receiving pressurized plastic therein, said machine comprising, in combination, a base, a first platen mounted on said base and holding the first of said mold halves, a back plate mounted on said base and spaced from said first platen, rods passing between and mounted to said first platen and said back plate, a second platen movably mounted on said rods between said first platen and said back plate and holding the second of said mold halves, members connected to said back plate projecting toward said second platen and surrounding said rods, means on said second platen for telescopically receiving said projecting members when said mold halves are in the open position, means for moving said second platen toward said first platen for closing said mold halves, blocking means for interposition between said projecting members and said receiving means when said mold halves are in the closed position, and load cells operatively connected to said rods for clamping said mold halves together during injection of pressurized plastic therein, said load cells forcing said back plate, said projecting members, said receiving means, said second platen and thereby said second mold half into clamping relationship with said first mold half.

2. The apparatus of claim 1 wherein said moving means comprises a first hydraulic cylinder means mounted on said back plate for selectively rapidly advancing or retracting said second platen toward said first platen and further including a hydraulic cylinder means operatively connected to said first hydraulic cylinder means and to said second platen for moving said second mold half into abutting and closed relationship with said first mold half.

3. The apparatus of claim 1, wherein said load cells are defined in said first platen.

4. The apparatus of claim 1, wherein said load cells comprise piston means provided on each of said rods, and hydraulic cylinder cavities are defined in said second platen for receiving each of said piston means on each of said rods.

5. The apparatus of claim 1 wherein means are provided for adjusting the relative space between said mold halves at the starting position.

6. The apparatus of claim 5 wherein said adjusting means comprises means for rotating all of said projecting members simultaneously for axially moving said members and said back plate relative to said rods.

7. The apparatus of claim 1 wherein said back plate is of a substantial hollow construction.

8. The apparatus of claim 1 wherein said blocking means comprise pairs of locking members spanning said rods while movable in and out of blocking relationship with said projecting members and said receiving means.

9. The apparatus of claim 8 wherein said blocking member pairs are movable in a scissors action, and drive means are provided for causing said scissors type of action.

10. The apparatus of claim 1 wherein a support plate is mounted on said second platen and said blocking means are operatively mounted on said support plate.

References Cited

UNITED STATES PATENTS

| | | | |
|---|---|---|---|
| 3,590,436 | 7/1971 | Halsingborg | 18—30 LA |
| 3,590,437 | 7/1971 | Annis | 18—30 LA |
| 3,590,418 | 7/1971 | Hoerschel | 18—30 LA |

H. A. KILBY, Jr., Primary Examiner

U.S. Cl. X.R.

425—442, 450